United States Patent
Naito et al.

(10) Patent No.: US 7,584,050 B2
(45) Date of Patent: Sep. 1, 2009

(54) AUTOMOBILE NAVIGATION SYSTEM

(75) Inventors: Takahiro Naito, Kariya (JP); Takafumi Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 691 days.

(21) Appl. No.: 11/232,916

(22) Filed: Sep. 23, 2005

(65) Prior Publication Data
US 2006/0074552 A1 Apr. 6, 2006

(30) Foreign Application Priority Data

Oct. 6, 2004 (JP) .............................. 2004-293723
Jul. 25, 2005 (JP) .............................. 2005-214503

(51) Int. Cl.
*G01C 21/00* (2006.01)

(52) U.S. Cl. ................. 701/211; 701/213; 701/209; 340/995.27

(58) Field of Classification Search ......... 701/207–213; 340/990, 995.1, 995.27
See application file for complete search history.

(56) References Cited

U.S. PATENT DOCUMENTS 6,859,728 B2 * 2/2005 Sakamoto et al. .......... 701/211
6,977,630 B1 * 12/2005 Donath et al. .................. 345/7

FOREIGN PATENT DOCUMENTS

| JP | A-9-329456 | 12/1997 |
|----|------------|---------|
| JP | A-2002-331850 | 11/2002 |

* cited by examiner

*Primary Examiner*—Richard M. Camby
(74) *Attorney, Agent, or Firm*—Posz Law Group, PLC

(57) ABSTRACT

A driver's action at a target intersection in a guided route is predicted based on driving data. When the driver is attempting to go straight ahead at a target intersection where the driver should make a turn, or when the driver is attempting to make a turn at a target intersection where the driver should go straight ahead, the predicted driver's action is determined to disagree with the guided route. In this case, an execution of an audio guidance is performed but re-execution is awaited for a predetermined period. Further, when the driver is attempting to go straight ahead at a target intersection where the driver should make a turn, an audio guidance is executed after a distance to the target intersection is determined to be smaller than a required distance computed from a vehicle speed.

20 Claims, 10 Drawing Sheets

FIG. 10A
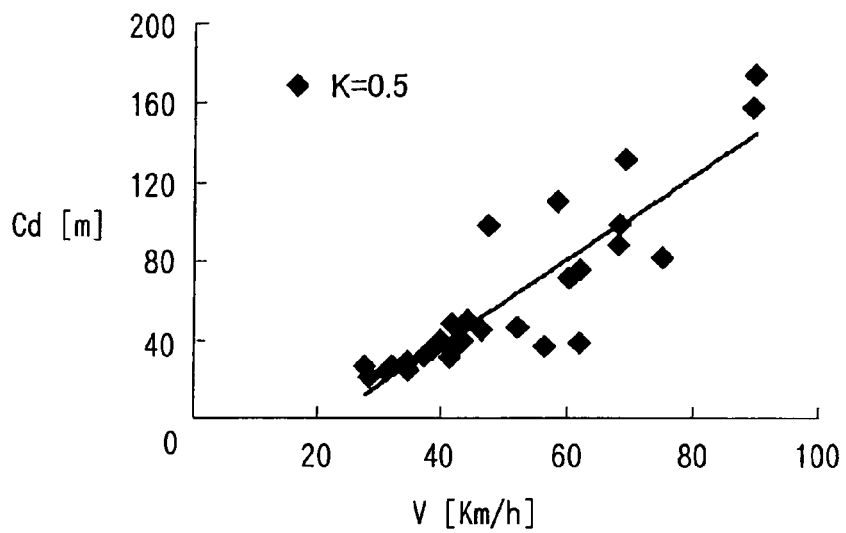
FIG. 10B
| TH | RECOGNITION RATE (%) | CORRELATION FACTOR (V:Cd) |
|---|---|---|
| 0.5 | 82.4 | 0.88 |
| 0.6 | 85.3 | 0.89 |
FIG. 11
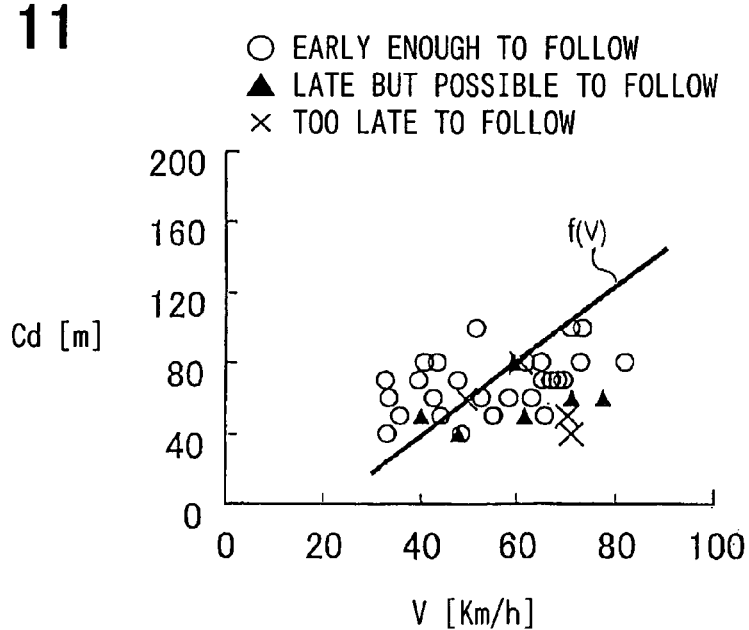

AUTOMOBILE NAVIGATION SYSTEM

CROSS REFERENCE TO RELATED APPLICATIONS

This application is based on and incorporates herein by reference Japanese Patent Applications No. 2004-293723 filed on Oct. 6, 2004 and No. 2005-214503 filed on Jul. 25, 2005.

FIELD OF THE INVENTION

The present invention relates to an automobile navigation system that provides guidance using a prediction on a vehicle driver's action.

BACKGROUND OF THE INVENTION

Conventionally, automobile navigation systems mounted in vehicles set a route to a destination and provides a driver with guidance (route guidance) using graphics and voice according to the set route.

For example, audio guidance related to a course at an intersection is provided by taking the following procedure: the distance from the relevant vehicle to the intersection is computed based on (i) the absolute position computed from observational data from GPS and the like and (ii) map data used in display of the present position and set routes and the like; the distance to the intersection is reported by voice, together with a course at the intersection.

In general, such audio guidance is singly provided at some point in time when the vehicle has approached an intersection. Therefore, when the driver is paying attention to the behavior of other cars, for example, the driver can miss the guidance. Various measures are known to cope with this. For example, a driver's reaction to audio guidance is detected through the presence or absence of a turn-signal signal. When the driver's reaction is not in accordance with the instruction of audio guidance, audio guidance is provided again. (Refer to Patent Document 1, for example.)

Patent Document 1: JP-H9-329456 A

However, these measures involve a problem. The timing with which a driver lights up a turn signal when turning to the right or left at an intersection differs from driver to driver. Therefore, though a driver attempts to drive his/her car in accordance with a route set by an automobile navigation system, audio guidance can be repeated. This causes driver discomfort.

SUMMARY OF THE INVENTION

Consequently, it is an object of the present invention to provide an automobile navigation system that executes audio guidance without causing driver discomfort to solve the above problem.

To achieve the above object, an automobile navigation system of the present invention is provided with the following. A distance computing unit is included for acquiring route information indicating a route to a destination and position information indicating a present position of the vehicle, and for determining a distance to a guidance point included in the route information. A driving data acquiring unit is included for acquiring driving data including speed information about the vehicle and operation information about an operation that relates to a driver of the vehicle and has influence on a running state of the vehicle. An action predicting unit is included for predicting, with respect to the driver, an action at the guidance point based on a history of the acquired driving data. Furthermore, an audio guidance executing unit is included for executing audio guidance about the guidance point when the determined distance is equal to or less than a preset allowable value and the predicted action disagrees with an action that the driver is required to take at the guidance point.

Therefore, in an automobile navigation system of the present invention, audio guidance is not executed in the following case: the action that that driver is required to take at a guidance point (e.g., a junction in a route) agrees with the driver's action at the guidance point predicted from driving data. In other words, audio guidance is executed only when it is really required. As a result, required information can be provided without causing driver discomfort.

An automobile navigation system of the present invention predicts a driver's action based on the history of driving data comprising speed information and operation information. Therefore, a driver's action can be predicted before the driver takes some specific action (e.g., operation of a turn signal at a junction in a route) to be carried out short of a guidance point. Thus, more appropriate audio guidance can be executed than with conventional devices, which control audio guidance based on turn signals.

BRIEF DESCRIPTION OF THE DRAWINGS

The above and other objects, features, and advantages of the present invention will become more apparent from the following detailed description made with reference to the accompanying drawings. In the drawings:

FIGS. 10A and 10B are a graph and a table illustrating the results of experiments conducted to set conditions for executing audio guidance.

FIG. 11 is a graph illustrating the results of experiments (subjects' impression) conducted using an automobile navigation system that operates under the conditions for executing audio guidance obtained through experiments.

DETAILED DESCRIPTION OF THE PREFERRED EMBODIMENTS

Hereafter, description will be given to embodiments of the present invention with reference to the drawings.

First Embodiment

Figure 1:
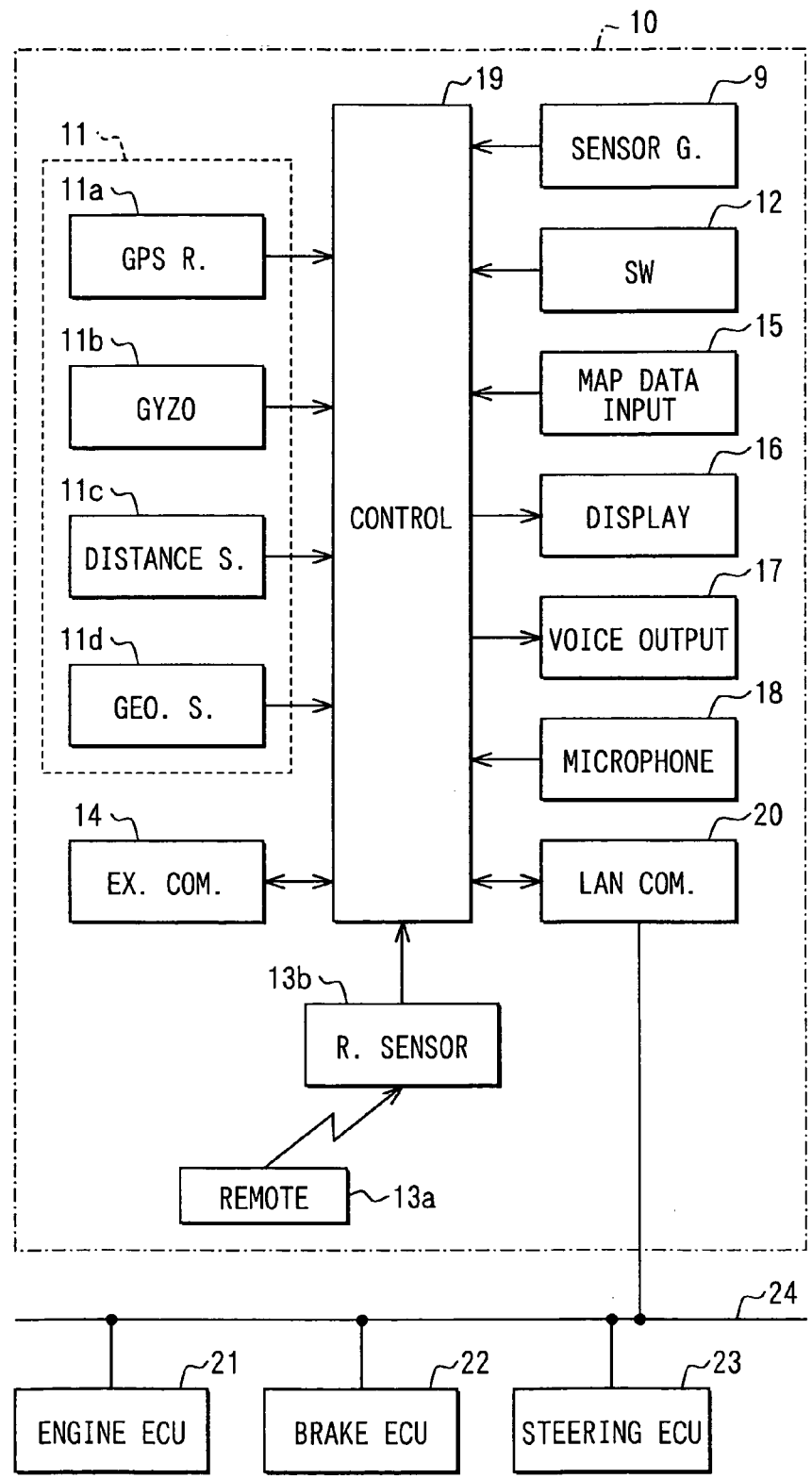
FIG. 1 is a block diagram illustrating the configuration of an automobile navigation system according to a first embodiment of the present invention and the general configuration of an in-vehicle LAN to which the automobile navigation system is connected.

FIG. 1 is a block diagram illustrating the configuration of an automobile navigation system 10 in a first embodiment and the general configuration of an in-vehicle LAN to which the automobile navigation system 10 is connected.

As illustrated in FIG. 1, the automobile navigation system 10 is mounted in a vehicle, and is connected with various ECUs, including an engine ECU 21, a brake ECU 22, and a steering ECU 23, and in-vehicle units through the in-vehicle LAN 24.

The engine ECU 21 is so constructed as to control the revolution of an engine based on, at least, a detection signal from an accelerator opening sensor that detects an accelerator opening corresponding to the amount of a driver's accelerator pedal depression. The brake ECU 22 is so constructed as to carry out ABS control, traction control, and the like based on, at least, detection signals from the following sensors: a master cylinder pressure sensor that detects the amount of brake operation from the oil pressure in a master cylinder that pressure feeds brake oil according to a driver's brake pedal operation; and a vehicle speed sensor that detects vehicle speed. The steering ECU 23 is so constructed as to control a power steering that produces assist force when the steering angle of a steering wheel is changed, based on, at least, a detection signal from a steering angle sensor that detects the turning angle of front wheels when a driver operates the steering wheel.

These ECUs 21 to 23 are so constructed that they arbitrarily communicate varied vehicle information (accelerator opening, amount of brake operation, vehicle speed, and the like), detected at the ECUs and the like, between them through the in-vehicle LAN 24.

The automobile navigation system 10 comprises: a position detector 11 that is mounted in the vehicle and detects the present position of the vehicle; a sensor group 9 comprising various sensors that detect the circumstances surrounding the vehicle; an operation switch group 12 for inputting various instructions from a user; a remote control terminal (hereafter, referred to as "remote") 13a that is capable of inputting various instructions, just like the operation switch group 12, and is separate from the automobile navigation system 10; a remote sensor 13b that inputs signals from the remote 13a; an external communication instrument 14 that is connected with a packet communications network and carries out communication with the outside; a map data input device 15 that inputs map data and the like from map storage media in which map data and varied information are recorded; a display unit 16 for displaying maps and varied information; a voice output unit 17 for outputting various guiding voices; a microphone 18 that outputs electrical signals based on voice let out by the user; an in-vehicle LAN communication unit 20 that communicates varied vehicle information and the like with other units through the in-vehicle LAN 24; and a control unit 19. The control unit executes various processes according to input from the above-mentioned position detector 11, sensor group 9, operation switch group 12, remote sensor 13b, map data input device 15, microphone 18, and in-vehicle LAN communication unit 20, and controls the display unit 16, voice output unit 17, and in-vehicle LAN communication unit 20. The position detector 11 comprises: a GPS receiver 11a that receives radio waves from artificial satellites for GPS (Global Positioning System) through a GPS antenna, not shown, and outputs the resulting reception signal; a gyro scope 11b that detects the magnitude of rotational motion applied to the vehicle; a distance sensor 11c that detects a mileage from acceleration in the direction of the length of the vehicle and the like; and a geomagnetic sensor lid that detects a traveling azimuth from geomagnetism. Based on output signals from these sensors and the like 11a to 11d, the control unit 19 computes the position, azimuth, speed, and the like of the vehicle. There are various methods, including individual positioning method and relative positioning method (D-GPS method, interference positioning method), for determining the present position based on an output signal from the GPS receiver 11a, and either of them may be used. It is preferable that of the interference positioning methods, especially, the RTK-GPS (RealTime Kinematics Global Positioning System) should be utilized.

The operation switch group 12 comprises a touch panel constructed integrally with the display surface of the display unit 16 and mechanical key switches and the like provided around the display unit 16. The touch panel and the display unit 16 are integrally laminated. There are various types of touch panel, including pressure sensitive type, electromagnetic induction type, capacitance type, and combinations of them, and any type may be used.

The sensor group 9 includes sensors such as publicly known raindrop sensor and solar sensor that can be used to identify weather. In addition, the sensor group includes the following: sensors and equipment that can be used to identify a period of time, for example, a sensor for detecting the state of lighting of the headlight of the relevant vehicle and a timer, a camera that picks up the image of the surroundings of the vehicle, and the like.

The external communication instrument 14 is so constructed as to communicate data with GPS reference base stations through an external packet communications network (during positioning by the RTK-GPS method).

The map data input device 15 is a device for inputting varied data stored in the map storage media, not shown. The map storage media stores map data (node data, link data, cost data, road data, geographic data, mark data, intersection data, data about facilities, and the like), voice data for guidance, voice recognition data, and the like. As storage media for storing these data, storage media such as hard disk and memory card as well as CD-ROM and DVD-ROM can be used.

The display unit 16 is a color display device. There are various types of display device, including liquid crystal display, organic EL display, and CRT, and any type may be used. The display screen of the display unit 16 shows a map image based on map data inputted from the map data input device 15, and additional data is displayed over the map image. The additional data includes a mark indicating the present location of the vehicle, detected by the position detector 11, a guided route to a destination, names, landmarks, marks for various facilities, and the like.

The voice output unit 17 outputs information on a facility inputted from the map data input device 15 and various types of guidance by voice.

The microphone 18 is so constructed that, when the user inputs his/her voice (speech), it outputs an electrical signal (aural signal) based on the inputted voice to the control unit 19. The automobile navigation system 10 is so constructed that it can be operated by a voice command inputted through this microphone 18.

The in-vehicle LAN communication unit 20 communicates with various devices (ECUs 21 to 23 and the like) connected to the in-vehicle LAN 24 through the in-vehicle LAN 24.

The control unit 19 is constructed based on a publicly known microcomputer comprising CPU, ROM, RAM, I/O, bus lines connecting these elements, and the like. It carries out various processes based on programs stored in the ROM and the RAM. A process may be executed using a CPU, a ROM, and the like. Here, steps in the process may be constructed as means or units in program stored in the ROM or the like.

Figure 2:
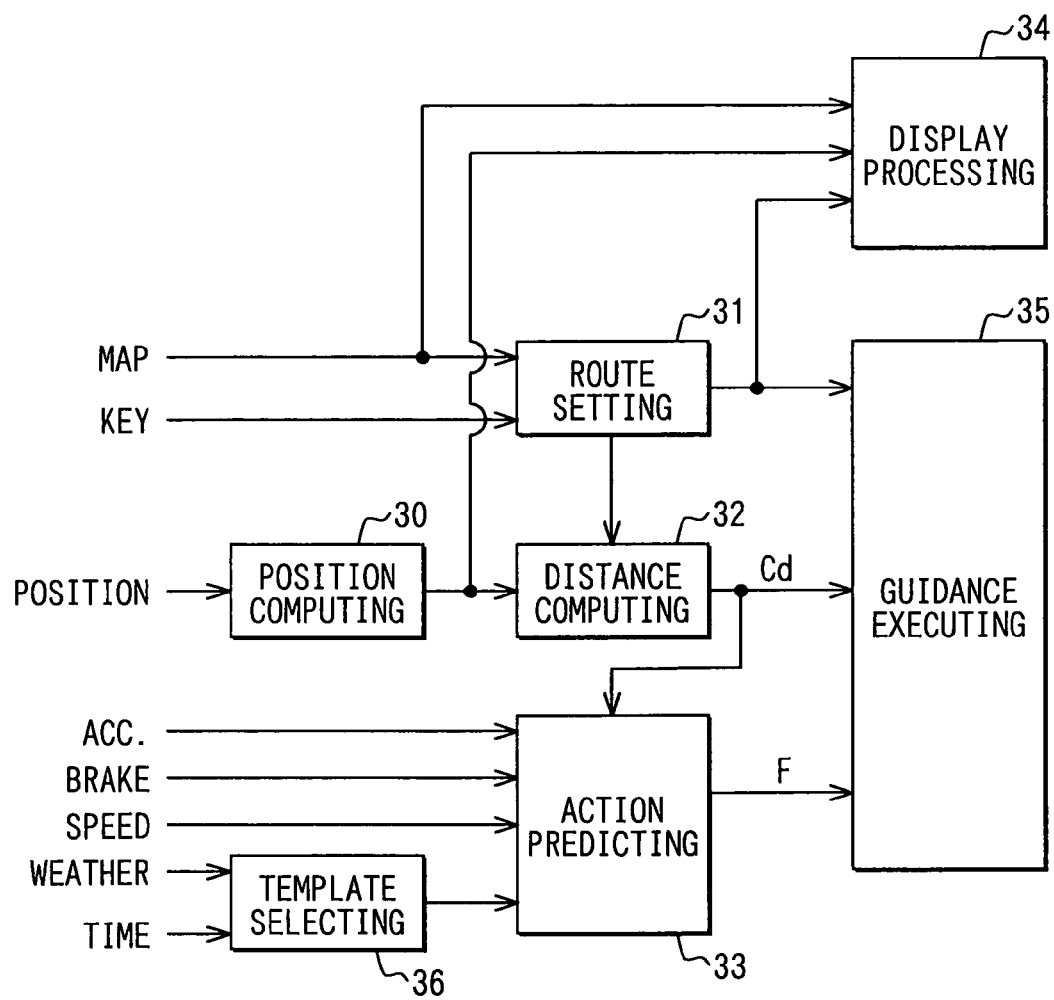
FIG. 2 is a functional block diagram providing the overview of processes carried out by a control unit.

FIG. 2 is a functional block diagram providing the overview of processes carried out by the control unit 19.

As illustrated in FIG. 2, the control unit 19 comprises: a position computing unit 30 that obtains position information indicating the present position of the vehicle based on a detection signal from the position detector 11 and data from a GPS reference base station, obtained through the external communication instrument 14; a route setting unit 31 that sets a destination, sets the optimum route from the present position to the destination, and performs other like operations according to map data obtained from the map data input device 15, operation of the operation switch group 12 or the remote 13a, a voice command from the microphone 18, or the like; a distance computing unit 32 that computes the distance to the nearest guidance point (intersection in this embodiment), set in a route, according to the position information obtained through computation by the position computing unit 30 and a route set by the route setting unit 31; a template selecting unit 36 that selects a template (described later) to be used, based on the weather and the period of time identified or designated according to information from the sensor group 9; and a driver's action predicting unit 33. The driver's action predicting unit predicts the driver's action based on operation information related to the driver's vehicle operation that has influence on the running state of the relevant vehicle, acquired from the ECUs 21 to 23 and the like through the in-vehicle LAN communication unit 20, and a template selected by the template selecting unit 36. The operation information includes vehicle speed, accelerator opening, and the amount of brake operation.

The control unit 19 comprises a display processing unit 34 and an audio guidance executing unit 35. The display processing unit 34 causes the display unit 16 to display a map of the area close to the present position read through the map data input device 15 based on the position information (present position) computed by the position computing unit 30. At this time, a mark indicating the present position and a route set by the route setting unit 31 are also displayed. The audio guidance executing unit 35 executes guidance on a guidance point included in route information by voice through the voice output unit 17 according to route information from the route setting unit 31, distance information Cd from the distance computing unit 32, and a prediction result flag F indicating the result of prediction by the driver's action predicting unit 33.

The ROM constituting the control unit 19 stores action pattern templates used when the driver's action predicting unit 33 predicts the driver's action. Multiple types of action pattern templates, classified by weather kinds (fair weather, cloudy weather, rainy weather, snowy weather, and the like) or periods of time (dawn, daytime, twilight, nighttime, and the like), are predicted.

Description will be given to the procedure for creating an action pattern template with reference to the flowchart shown in FIG. 3 and the explanatory drawing shown in FIG. 4. Action pattern templates are created through processing performed on a computer external to the automobile navigation system 10.

Figure 3:
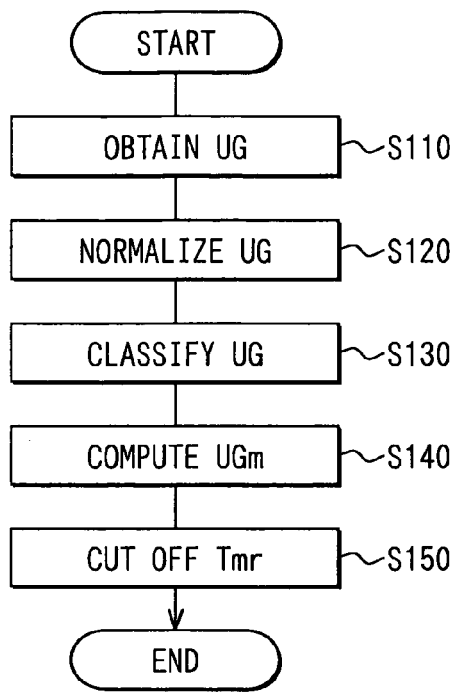
FIG. 3 is a flowchart illustrating the procedure for creating an action pattern template.

As illustrated in FIG. 3, driving data expressed by multiple pieces of vehicle information (accelerator opening A, amount of brake operation B, and vehicle speed V in this embodiment) specified in advance is loaded from a database by specifying environmental conditions (S110). The database accumulates data obtained by sampling varied vehicle information indicating the state of the vehicle at preset sampling intervals S, with respect to each environmental condition specified by weather and period of time.

The driving data accumulated in the database may be collected through measurement using an actual vehicle or may be collected using a driving simulator (pseudo driving data). The accumulated data may be collected with respect to a specific individual or may be collected with respect to general public. Tp/S (=N1) pieces of accumulated data acquired during a predetermined period Tp before an intersection are taken as a before-intersection accumulated data group UG. With respect to all the intersections at which the driver turned to the right or left, before-intersection accumulated data groups UG are loaded, and 100 of such before-intersection accumulated data groups UG are loaded.

The elements A, B, and V of all the accumulated data loaded as mentioned above are normalized so that each of them has a value of 0 to 1 (S120), and then the before-intersection accumulated data groups UG are classified using a clustering method (S130).

More specifically, distances between before-intersection accumulated data groups UG are defined, and those short in this distance from each other are classified into the same cluster. This clustering method is publicly known, and, for example, the k-means can be used for this purpose; however, the clustering method is not limited to this.

Figure 4:
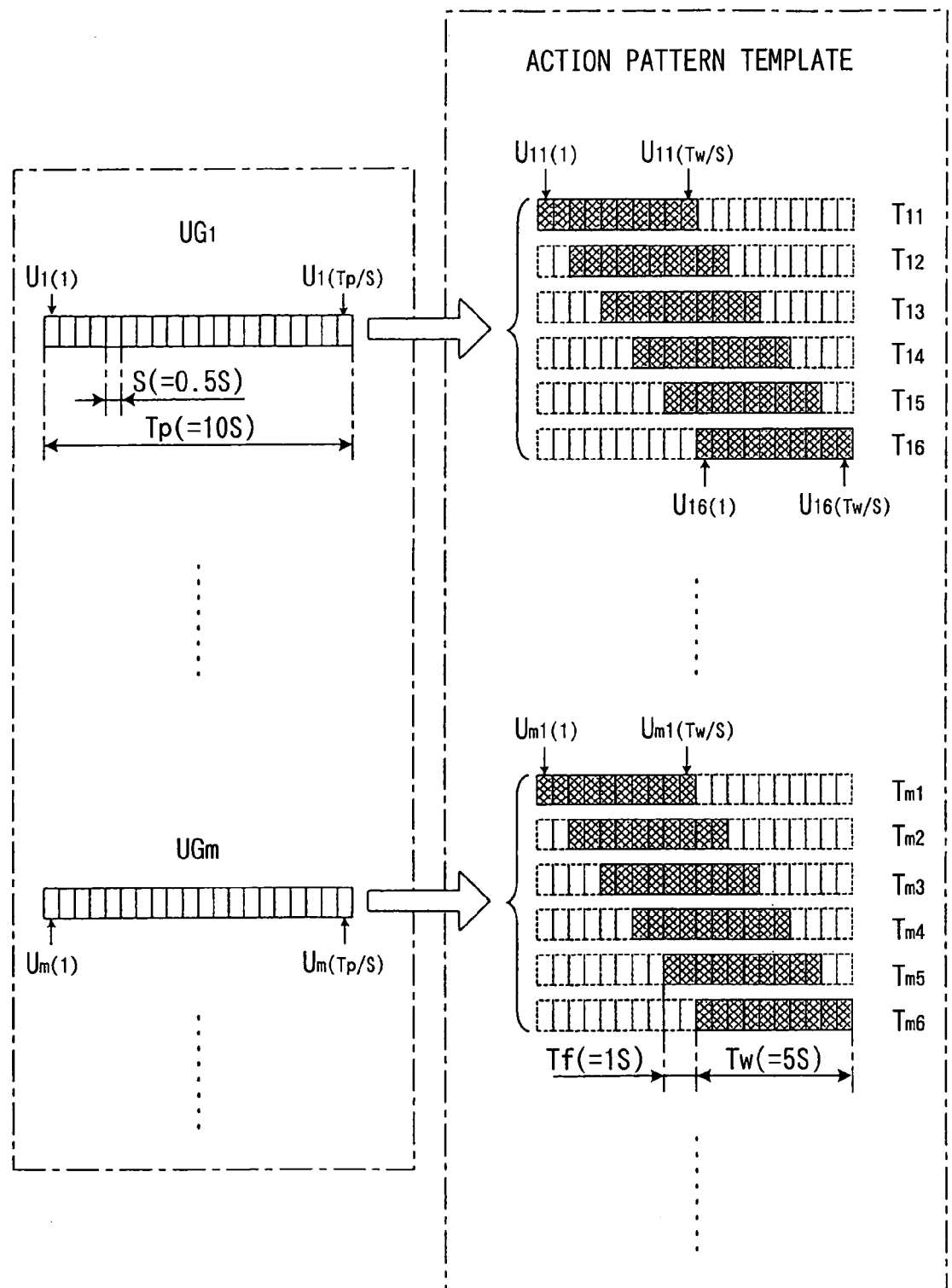
FIG. 4 is an explanatory drawing illustrating the construction of an action pattern template.

The average value of the before-intersection accumulated data groups UG classified as illustrated on the left of FIG. 4 is computed with respect to each of M clusters (m=1 to M) in accordance with the result of classification at S130 (S140).

Hereafter, the average value of the before-intersection accumulated data groups UG in cluster m will be designated as average data group UGm, and it is expressed by Expression (1). In Expression (1), Um(i) represents the i (i=1 to Tp/S)-th average accumulated data constituting average data group UGm, and it is expressed by Expression (2). In Expression (2), Am(i) represents the average value of accelerator opening A obtained by extracting the accelerator opening A in the i-th data from all the before-intersection accumulated data groups UG included in the same cluster m. Bm(i) and Vm(i) respectively represent the average value of amount of brake operation B and the average value of vehicle speed V determined by the same manner.

$$UGm=\{Um(1),Um(2),\ldots,Um(Tp/S)\} \quad (1)$$

$$Um(i)=\{Am(i),Bm(i),Vm(i)\} \quad (2)$$

As illustrated on the right side of FIG. 4, consecutive Tw/S (=N2) pieces of average accumulated data Um(i) are cut off while being shifted by Tf/S, with respect to each of the M average data groups UGm obtained as mentioned above. The R (=(Tp−Tw)/Tf+1) groups (partial data groups) cut off as mentioned above are cut off as action pattern templates Tmr (r=1 to R) (S150), and this procedure is terminated.

In the above expression, Tw represents the length of period indicated by an action pattern template, and Tf represents the length of the period of shift used when an action pattern template is cut off.

The action pattern template Tmr is expressed by Expression (3), and Umr(j) in Expression (3) is average accumulated data defined by Expression by (4) with j=1 to Tw/S. Umr(j) is expressed by Expression (5), and Amr(j), Bmr(j), and Vmr(j) in Expression (5) are respectively the average values of accelerator opening, amount of brake operation, and vehicle speed defined similarly with Expression (4).

$$Tmr = \{Umr(1), Umr(2), \ldots, Umr(Tw/S)\} \quad (3)$$

$$Umr(j) = Um(j + (r-1) \times Tf/S) \quad (4)$$

$$Umr(j) = \{Amr(j), Bmr(j), Vmr(j)\} \quad (5)$$

That is, R action pattern templates Tmr are generated with respect to each cluster m, and M×R action pattern templates are generated in total. The above procedure is repeated with respect to all the environmental conditions with the environmental condition selected at S110 changed in succession. Thus, the action pattern template Tmr is generated with respect to each environmental condition.

In this embodiment, S=0.5 seconds, Tp=10 seconds, Tw=5 seconds, and Tf=1 second, and Tp/S=20 pieces, Tw/S=10 pieces, Tf/S=2 pieces, and R=6 pieces. The number of clusters M differs depending on the result of processing at S130; however, it is 5 to 7 or so. Therefore, the action pattern template Tmr is in the order of 30 to 40 pieces or so.

Description will be given to the processes carried out by the control unit 19.

The processes carried out by the position computing unit 30, route setting unit 31, distance computing unit 32, and display processing unit 34 are publicly known processes; therefore, the description of them will be omitted. Description will be given to the processes carried out by the template selecting unit 36, driver's action predicting unit 33, and audio guidance executing unit 35 associated with the principal part of the present invention with reference to the flowcharts shown in FIGS. 5, 6, and 8.

Figure 5:
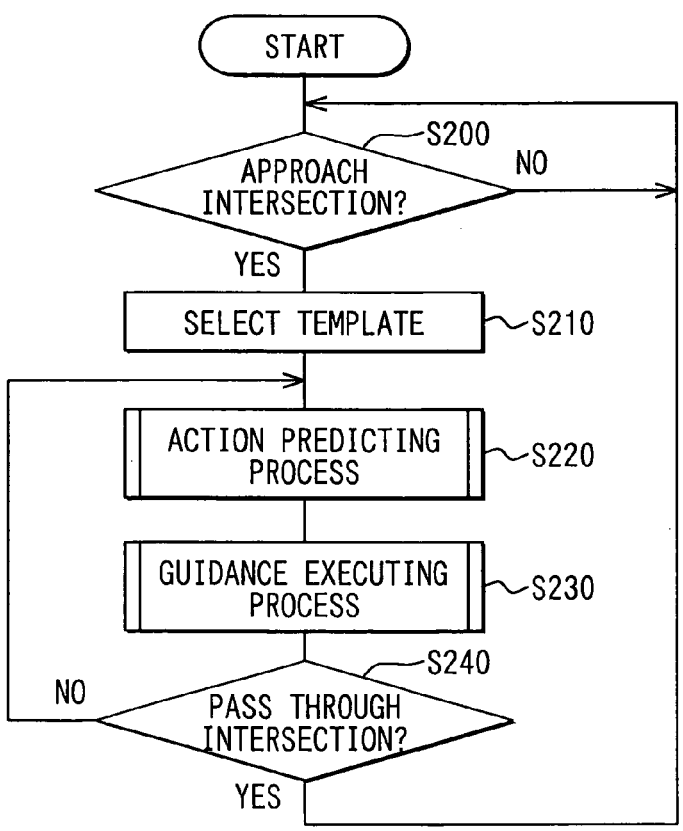
FIG. 5 is a flowchart providing the overview of processes corresponding to a driver's action predicting unit and an audio guidance executing unit.

Once a route to a destination is set by the route setting unit 31, the process illustrated in FIG. 5 is repeatedly carried out until the vehicle arrives at the destination.

When this process is started, the distance Cd to an intersection (This intersection will be hereafter referred to as "target intersection.") is acquired from the distance computing unit 32, and it is determined whether the distance Cd is equal to or less than a preset determination start distance (300 m in this embodiment) (S200). When the distance Cd is greater than the determination start distance, this step is repeated and the operation thereby waits. When the distance Cd is equal to or less than the determination start distance, it is determined that the vehicle has sufficiently approached the target intersection. Then, template selecting process (S210) corresponding to the template selecting unit 36, driver's action predicting process (S220) corresponding to the driver's action predicting unit 33, and audio guidance executing process (S230) corresponding to the audio guidance executing unit 35 are carried out.

Thereafter, the distance Cd to the intersection is acquired from the distance computing unit 32, and, based on the distance Cd, it is determined whether the vehicle has passed through the target intersection (S240). When the vehicle has not passed through the target intersection, the operation returns to S220 and the processes of S220 and S230 are carried out again. When the vehicle has passed through the target intersection, the operation returns to S200, and the same processing is performed with the next intersection taken as the target intersection.

In the template selecting process carried out at S210, an environmental condition is identified from weather or period of time identified based on information from the sensor group 9, and a template to be used is selected based on the identified environmental condition.

Figure 6:
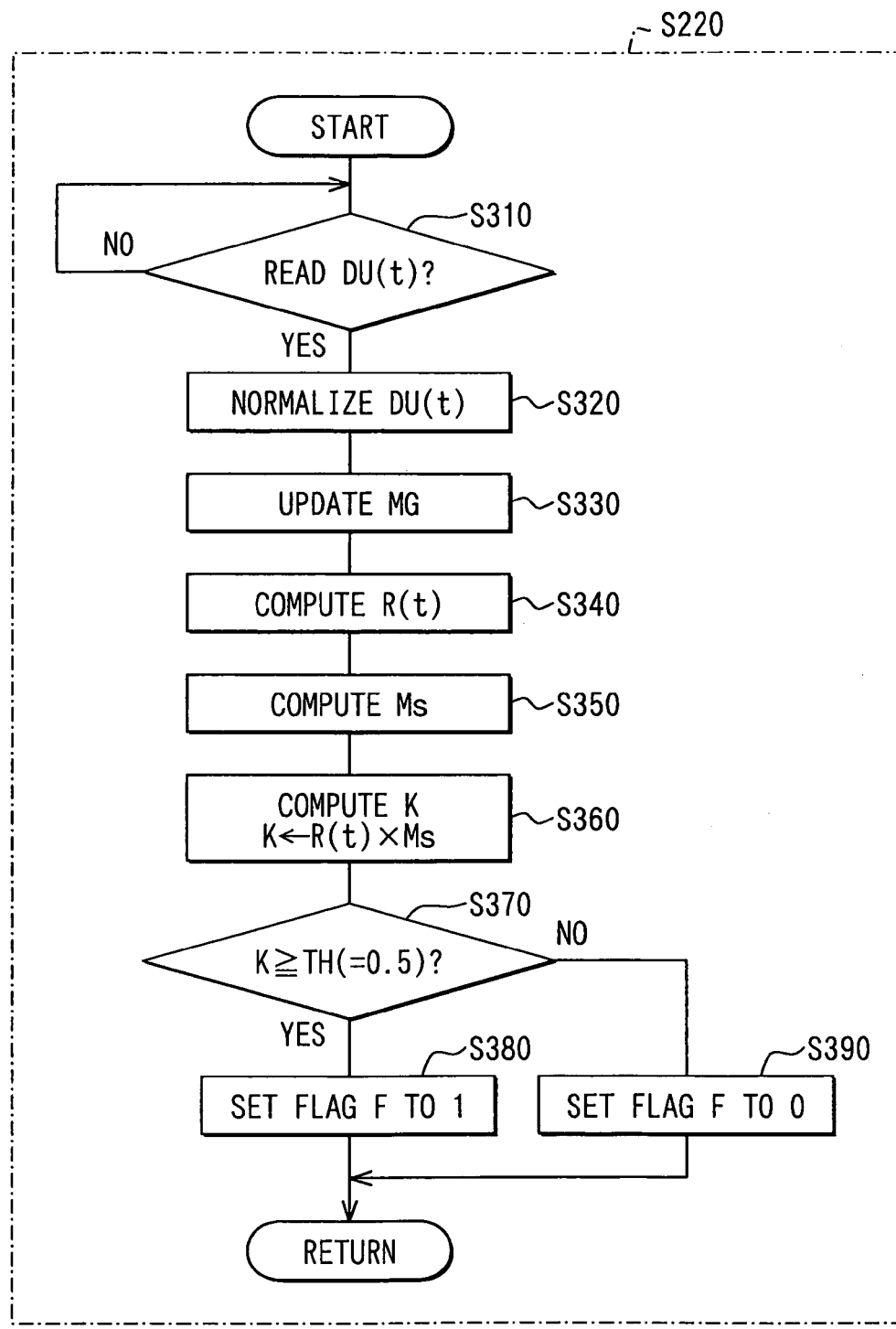
FIG. 6 is a flowchart illustrating the details of driver's action predicting process.

Detailed description will be given to the driver's action predicting process carried out at S220 with reference to the flowchart shown in FIG. 6.

In this process, the operation waits until driving data DU(t)={A(t), B(t), V(t)} that contains accelerator opening A(t), amount of brake operation B(t), and vehicle speed V(t) as elements is read through the in-vehicle LAN communication unit 20 (S310). When driving data DU(t) is read, the elements A(t), B(t), and V(t) are normalized so that each of them takes a value of 0 to 1 (S320).

The time when data is sampled is represented by t, and driving data DU(t) is read at the above-mentioned sampling intervals S (=0.5 seconds).

Then, the data stored in the RAM constituting the control unit 19 is updated so that driving data DU(t), DU(t-S), ..., DU(t-Tw) for past Tw (=5 seconds), including this normalized driving data DU(t), is stored in the RAM (S330). In the following description, (Tw/S pieces of) driving data for Tw seconds, stored in the RAM, is taken as a driving data group MG and it is expressed by Expression (6), and each driving data MU(j) belonging to the driving data group MG is expressed by Expression (7). In the latter expression, j=1 to Tw/S, and j=1 represents the oldest data and j=Tw/S represents the newest data. That is, DU(t-Tw)=MU(1), ..., DU(t)=MU(Tw/S).

$$MG = \{MU(1), MU(2), \ldots, MU(Tw/S)\} \quad (6)$$

$$MU(j) = \{A(j), B(j), V(j)\} \quad (7)$$

Then, similarity R(t) at time t is computed based on the driving data group MG and the action pattern template Tmr stored in the ROM of the control unit 19 (S340).

Figure 7A:
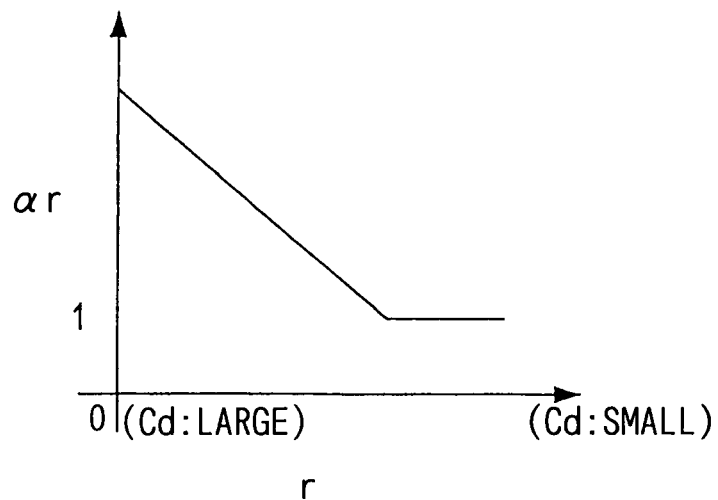
FIGS. 7A and 7B are graphs providing the overview of weighting factor used in computation of similarity and membership value used in computation of certainty factor.

Specifically, index data Rmr that indicates the distance from the driving data group MG is computed with respect to each action pattern template Tmr by Expression (8). In this expression, $\alpha_r$ is weighting factor, and it is so set that a template of a larger template number r, that is, a template based on data in a position closer to a target intersection takes a smaller value, as illustrated in FIG. 7A.

$$Rmr = \frac{\alpha_r \sum_{j=1}^{Tw/S} \sqrt{\{A(j) - Amr(j)\}^2 + \{B(j) - Bmr(j)\}^2 + \{V(j) - Vmr(j)\}^2}}{Tw/S} \quad (8)$$

Of the index data Rmr computed with respect to each of these action pattern templates Tmr, one having the smallest value (that is, the distance from the action pattern template most similar to the driving data group MG) is extracted as representative index data RE(t) at time t. (Refer to Expression (9).) At the same time, the largest one of the past representative index data computed as mentioned above is extracted as reference index data RK(t). (Refer to Expression (10).) Further, what is obtained by normalizing the representative index data RE(t) using the reference index data RK(t) is taken as similarity R(t). (Refer to Expression (11).)

$$RE(t) = \min\{R11, R12, \ldots, R1r, R21, \ldots, Rmr\} \quad (9)$$

$$RK(t) = \max\{\ldots, RE(t-2S), RE(t-S), RE(t)\} \quad (10)$$

$$R(t) = \frac{RK(t) - RE(t)}{RK(t)} \quad (11)$$

Figure 7B:
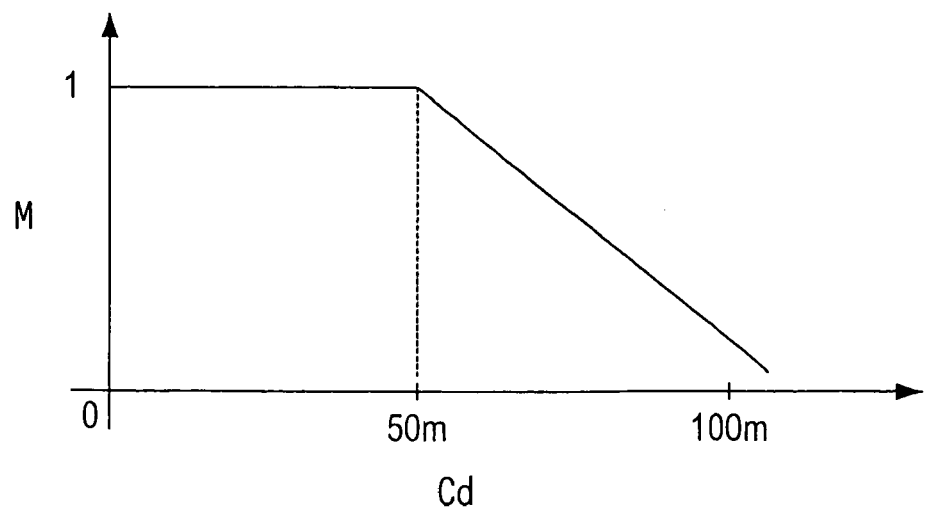

A membership value Ms is determined using a membership function that takes the distance Cd to the intersection, acquired from the distance computing unit 32, as input, and produces the following output: when the distance Cd is equal to or less than a certain distance (50 m in this embodiment), it outputs 1 and, when the distance Cd is greater than the certain distance, it outputs a value smaller than 1 that decreases with increase in distance Cd, as illustrated in FIG. 7B (S350).

This membership value Ms is multiplied by the similarity R(t) determined at S340, and a certainty factor K (=S(t)×Ms) is thereby computed (S360). Then, it is determined whether the certainty factor K is equal to or higher than a preset determination threshold value TH (0.5 in this embodiment) (S370).

When the certainty factor K is equal to or higher than the determination threshold value TH, it is determined that the driver is attempting to make a turn at an intersection, and the prediction result flag F is set to 1 (S380). When the certainty factor K is smaller than the determination threshold value TH, it is determined that the driver is attempting to go straight ahead, and the prediction result flag F is set to 0 (S390). Thereafter, this process is terminated.

Detailed description will be given to the audio guidance executing process carried out at S230 with reference to the flowchart shown in FIG. 8.

The route set by the route setting unit 31 is referred to, and it is determined whether the driver should make a turn (or the driver is required to make a turn) at the target intersection (S410) and whether the prediction result flag F is set to 1, that is, the driver is attempting to make a turn at the intersection (S420, S460). When the driver is attempting to make a turn at an intersection at which he/she should make a turn (S410: YES, S420: YES), or when the driver is attempting to go straight ahead at an intersection at which he/she should go straight ahead (should not make a turn) (S410: NO, S460: NO), the course at the target intersection based on the set route agrees with the driver's action. Therefore, audio guidance is not executed, and this process is terminated.

When the driver is attempting to go straight ahead at an intersection at which he/she should make a turn (S410: YES, S420: NO), it is determined whether the distance Cd to the intersection is smaller than a required distance Dneed=f(V) computed using a function f(V) with the vehicle speed V normalized at S320 taken as input (S430).

Figure 9:
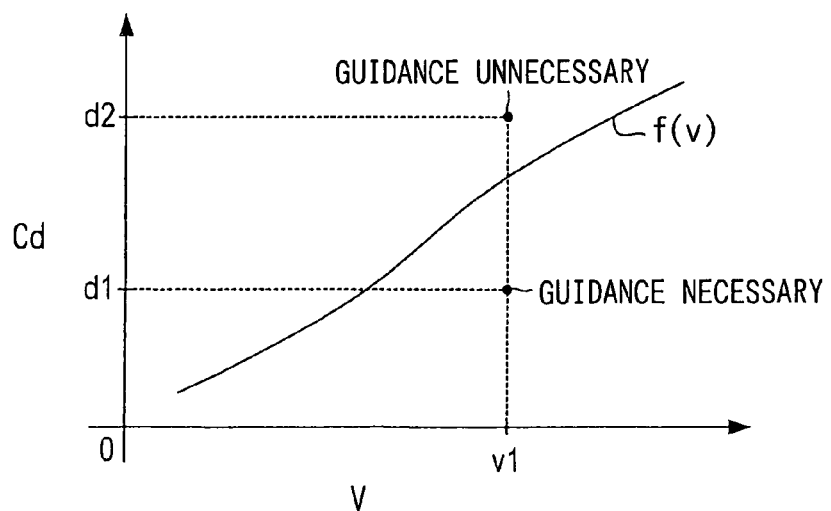
FIG. 9 is a graph illustrating conditions for executing audio guidance.

The function f(V) is so set that the following is implemented as illustrated in FIG. 9: the required distance Dneed increases with increase in vehicle speed V and the first audio guidance is started with such timing that the driver can follow the guidance in good time.

When the distance Cd to an intersection is smaller than the required distance Dneed (Refer to d1 in the figure.), audio guidance is executed to advise the driver that he/she should make a turn (or should not go straight ahead) at the target intersection (S440). Thereafter, the operation waits for a preset, predetermined time (e.g., 1 second) (S450), and this process is terminated. When the distance Cd to an intersection is equal to or greater than the required distance Dneed (Refer to d2 in the figure.), it is determined that it is too early to execute audio guidance. Then, audio guidance is not executed, and this process is terminated.

When the driver is attempting to make a turn at an intersection at which he/she should go straight ahead (S410: NO, S460: YES), audio guidance is executed to advise the driver that he/she should not make a turn (or should go straight ahead) at the target intersection (S470). Thereafter, the operation waits for a preset, predetermined time (e.g., 1 second) (S480), and this process is terminated.

As described above, in an automobile navigation system 10 in this embodiment, audio guidance is executed only when a preset course at a intersection disagrees with the driver's action at the intersection predicted from driving data DU(t). In addition, once audio guidance is executed, it is repeatedly carried out after a waiting interval until the course at the intersection agrees with the predicted action of the driver.

With an automobile navigation system 10 in this embodiment, therefore, the driver can be let to perceive the gist of audio guidance without fail, and further driver discomfort can be prevented in the following cases: cases where, though a driver is attempting to drive his/her car in accordance with a set course, audio guidance is executed; and cases where, though after execution of audio guidance, the driver is attempting to drive his/her car in accordance with the audio guidance, the audio guidance is repeated more than necessary.

The automobile navigation system 10 in this embodiment is so constructed that the following is implemented: even if a course at an intersection disagrees with the predicted action of the driver, audio guidance is not executed unless the distance to the intersection becomes equal to or smaller than a required distance Dneed determined according to vehicle speed. Therefore, audio guidance can be executed with such appropriate timing that the driver can driver his/her car in good time.

FIG. 10A illustrates points obtained by the following procedure, together with their approximated curve, in graph form: using driving data DU(t) collected using a driving simulator, action pattern templates Tmr are created by the above-mentioned template creating procedure; driver's action predicting process is carried out using these action pattern templates Tmr to determine a certainty factor K; and points at which K=0.5 are plotted. This approximated curve is expressed by f(V)=2.1314V−46.993.

FIG. 11 illustrates the result of the following procedure, together with the approximated curve f(V), in graph form: the same action pattern templates Tmr are used, and the determination threshold value TH is set to 0.5. Then, audio guidance is executed to advise subjects (drivers) that they should make a turn at an intersection without letting them know the route. The timing (the distance Cd to the intersection, vehicle speed V) of audio guidance at that time is brought into correspondence with the subjects' impressions, and the impressions are represented in graph form (plotted with hollow circle, solid triangle, and cross).

The following can be seen from FIG. 11: within the range of Cd>f(V), no subjects had the impression that they could not follow the instruction because it was given too late (cross in the figure).

The probability of a correct prediction result being obtained by the driver's action predicting process (recognition rate) was determined. As a result, the finding illustrated in FIG. 10B was obtained. As illustrated in the figure, when the determination threshold value TH was set to 0.5, the recognition rate was 82.4%, and, when TH was set to 0.6, the recognition rate was 85.3%. Thus, it can be seen that high recognition rates are obtained by the driver's action predicting process.

In the automobile navigation system 10, partial data groups cut off from average data group UG that indicates the average timing of production of characteristic patterns of change in driving data (accumulated data) that are produced before guidance points with the timing shifted are taken as template Tmr.

With the automobile navigation system 10, therefore, a characteristic change pattern can be grasped without fail even if it is produced earlier or later than average timing for some reason, and thus a driver's action can be predicted with accuracy.

In the automobile navigation system 10, a template Tmr is provided with respect to each environmental condition identified by weather or period of time, and a template Tmr suitable for different environmental conditions at different times is selected and used.

With the automobile navigation system 10, therefore, a driver's action can be always predicted with accuracy even if the road conditions, the surrounding luminance, or the like is changed.

Second Embodiment

Description will be given to a second embodiment.

An automobile navigation system 10 in this embodiment is different from those in the first embodiment only in part of the processes carried out by the control unit 19 as the driver's action predicting unit 33 and the audio guidance executing unit 35. Therefore, description will be given mainly to this difference.

Figure 12:
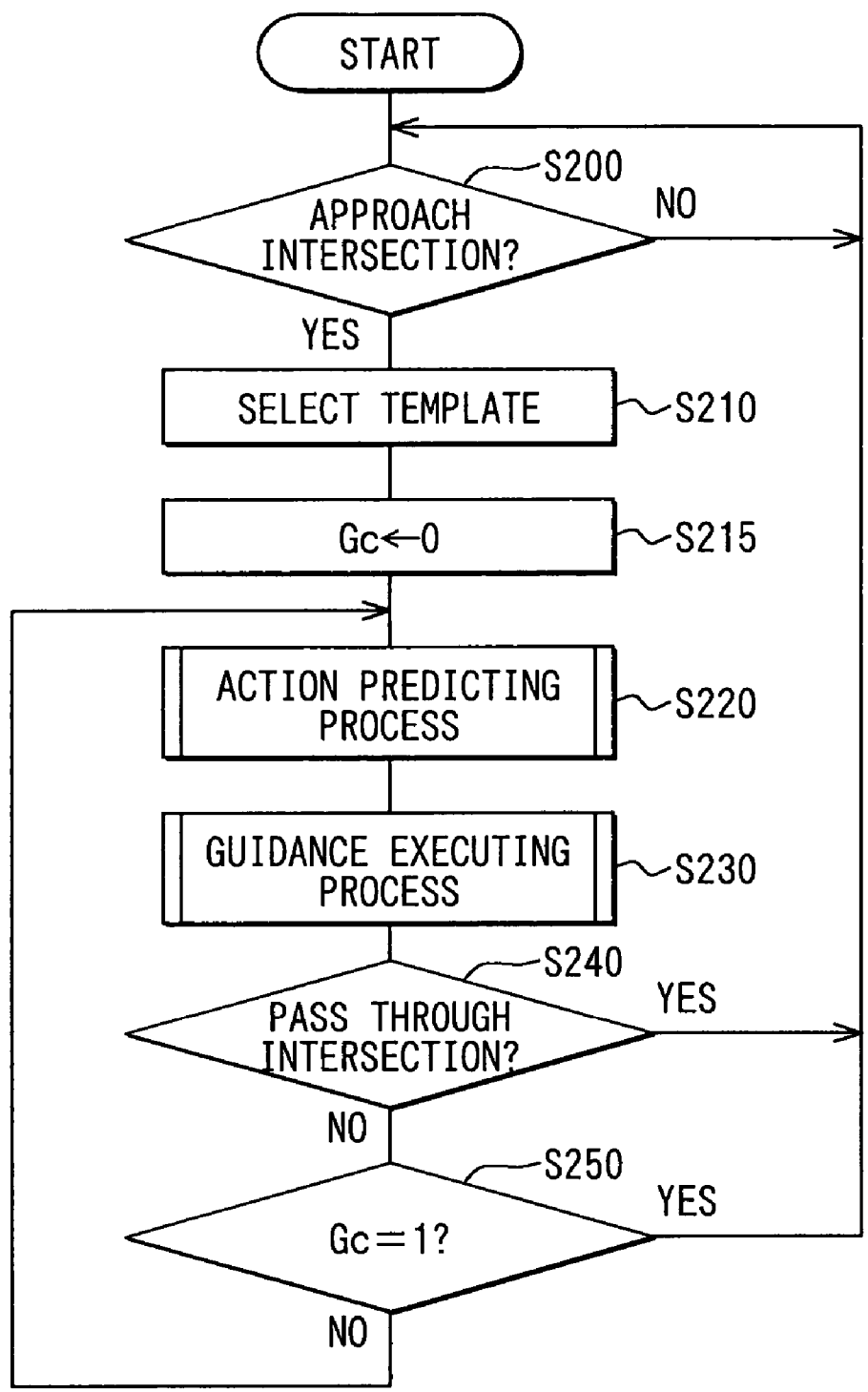
FIG. 12 is a flowchart providing the overview of processes corresponding to a driver's action predicting unit and an audio guidance executing unit according to a second embodiment of the present invention.

In this embodiment, as illustrated in FIG. 12, S215 and S250 are added to the process illustrated in FIG. 5.

More specific description will be given. When this process is started, the distance Cd to the target intersection is acquired from the distance computing unit 32, and the operation waits until the distance Cd becomes equal to or less than a preset determination start distance (300 m in this embodiment) (S200). When the distance Cd becomes equal to or less than the determination start distance, it is determined that the vehicle has sufficiently approached the target intersection. Then, a template is selected through template selecting process (S210) corresponding to the template selecting unit 36, and an execution flag Gc that indicates the state of audio guidance execution is set to 0, which indicates that audio guidance has not been executed yet (S215). Thereafter, driver's action predicting process (S220) corresponding to the driver's action predicting unit 33 and audio guidance executing process (S230) corresponding to the audio guidance executing unit 35 are carried out.

Thereafter, the distance Cd to the intersection is acquired from the distance computing unit 32, and, based on the distance Cd, it is determined whether the vehicle has passed through the target intersection (S240). When the vehicle has not passed through the target intersection, it is determined whether the execution flag Gc has been rewritten to 1 by the audio guidance executing process (described later) of S230 (S250). When the execution flag Gc has not been rewritten to 1, the operation returns to S220, and the processes of S220 to S230 are carried out again. When it is determined at S240 that the vehicle has already passed through the target intersection, and when it is determined at S250 that the execution flag Gc has been rewritten to 1, the operation returns to S200, and the above-mentioned processing is repeated with the next intersection taken as the target intersection.

Figure 8:
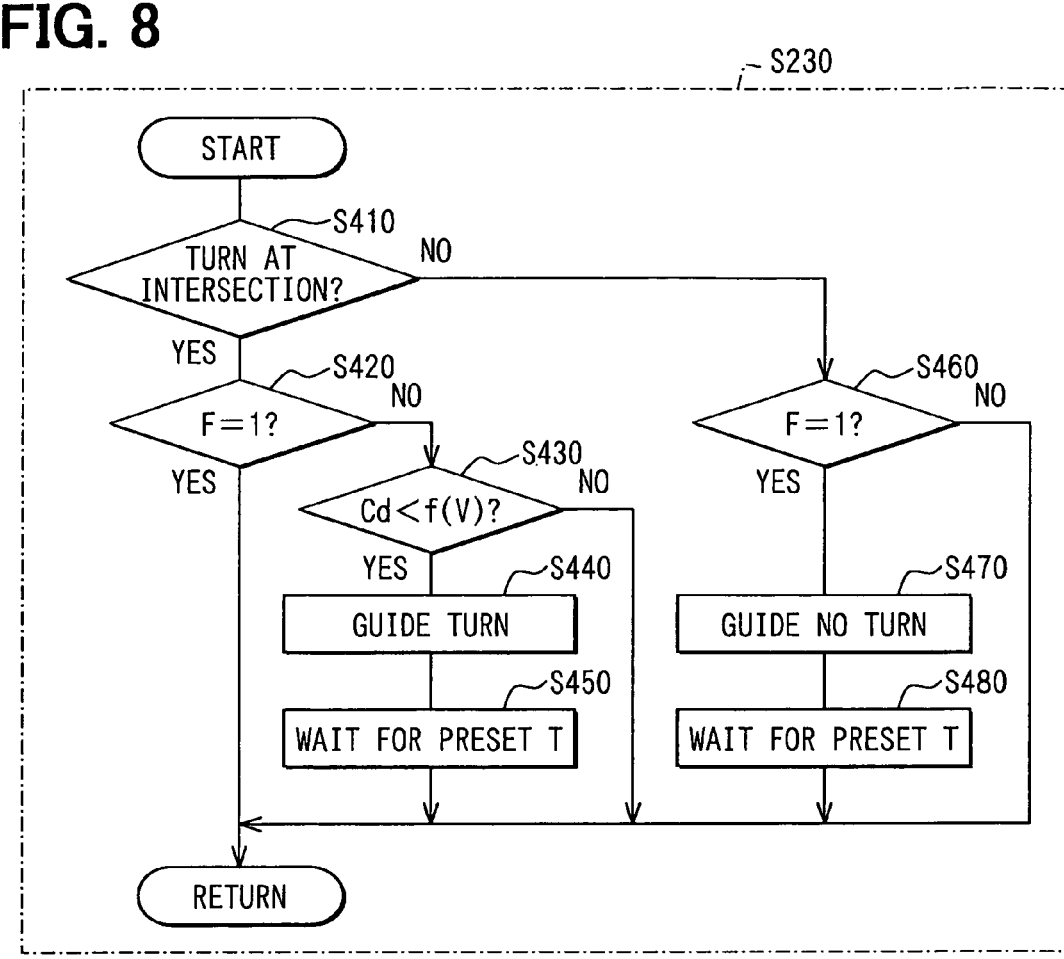
FIG. 8 is a flowchart illustrating the details of audio guidance execution process.
Figure 13:
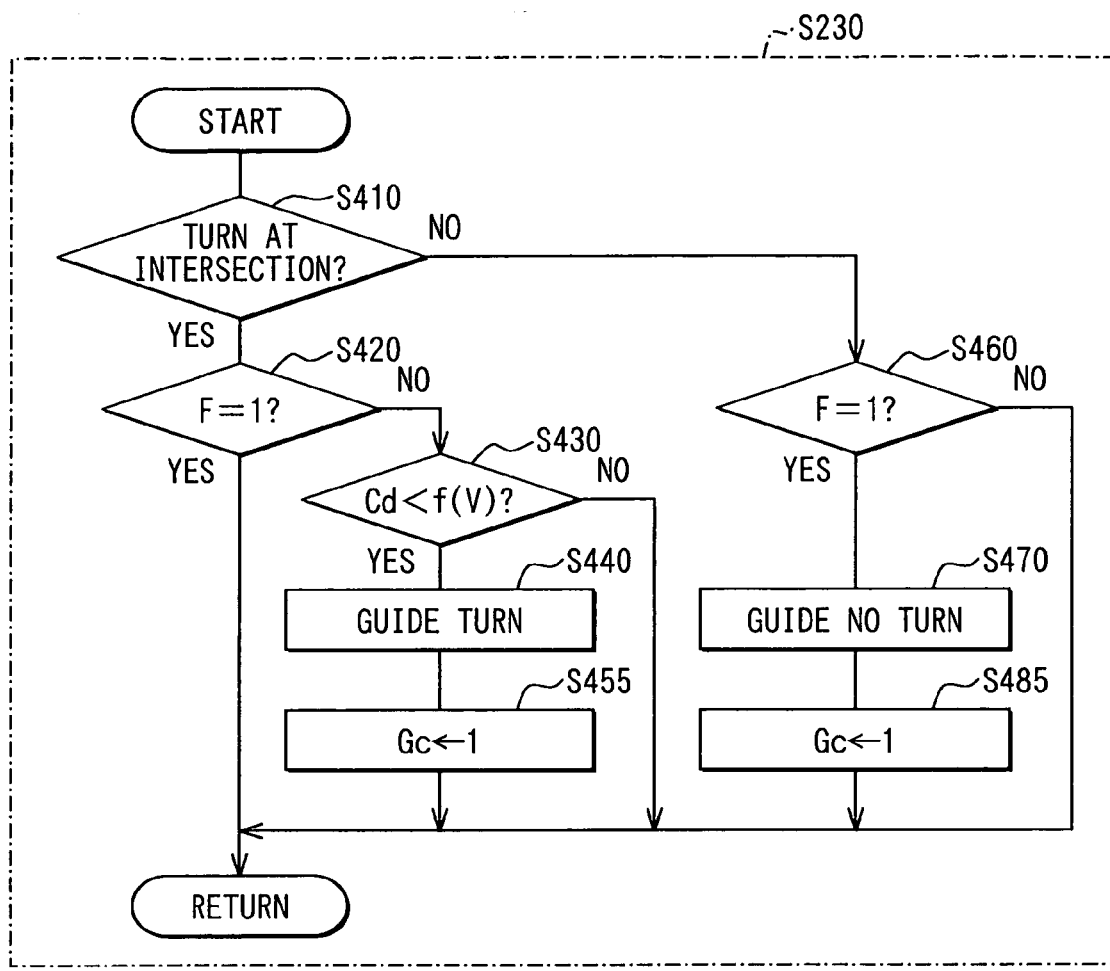
FIG. 13 is a flowchart illustrating the details of audio guidance execution process according to the second embodiment.

As illustrated in FIG. 13, the audio guidance executing process carried out at S230 is different from the process illustrated in FIG. 8 in that S455 and S485 are provided in place of S450 and S480. That is, the process in this embodiment is so constructed that, when audio guidance was carried out (S440, S470), the execution flag Gc is rewritten to 1 (S455, S485) instead of waiting for a predetermined time (S450, S480).

In the thus constructed automobile navigation system 10 in this embodiment, audio guidance is executed only once with such appropriate timing that the driver can follow it in good time. Therefore, driver discomfort can be prevented without fail from being caused by repeated audio guidance.

Up to this point, description has been given to some embodiments of the present invention. However, the present invention is not limited to the above-mentioned embodiments, and the present invention can be embodied in various modes without departing from its spirit.

Some examples will be taken. In the description of the above embodiments, intersections are taken as an example of a guidance point at which audio guidance is carried out. However, the guidance point is not limited to intersection, and any other point, such as highway ramp, can be used as long as it is a junction where a route bisects, or a branch.

The above embodiments use an accelerator opening A, an amount of brake operation B, and a vehicle speed V as vehicle information for use in prediction on a driver's action. The information other than the vehicle speed V, that is, the accelerator opening and the amount of brake operation may be replaced with other types of information as long as that is operation information related to the driver's vehicle operation that has influence on the running state of the relevant vehicle. Also, the number of pieces of information is not limited to three, and it may be two or less or four or more.

The above embodiments are so constructed that the environmental condition (weather or period of time) used to select a template Tmr is identified based on information from the sensor group 9. Instead, the present invention may be so constructed that the environmental condition is identified based on the following: the result of image recognition with respect to an image obtained by an in-vehicle camera; varied information (weather information, etc.) obtained from external equipment through the external communication instrument 14; and a driver's switch operation.

The above-embodiments use weather and period of time to select a template Tmr. Instead, the present invention may be so constructed that it is selected by either of them, or information other than weather and period of time that has influence on a driver's action or driving data DU(t) is used.

It will be obvious to those skilled in the art that various changes may be made in the above-described embodiments of the present invention. However, the scope of the present invention should be determined by the following claims.

What is claimed is:

1. A navigation system provided in a vehicle, the navigation system comprising:
    a distance computing unit for acquiring route information indicating a route to a destination and position information indicating a present position of the vehicle, and for determining a distance to a guidance point included in the route information;
    a driving data acquiring unit for acquiring driving data including speed information about the vehicle and operation information about an operation that relates to a driver of the vehicle and has influence on a running state of the vehicle;
    an action predicting unit for predicting, with respect to the driver, an action at the guidance point based on a history of the acquired driving data; and
    an audio guidance executing unit for executing audio guidance about the guidance point when the determined distance is equal to or less than a preset allowable value and the predicted action disagrees with an action that the driver is required to take at the guidance point,
    wherein the guidance point is a branch included in the route, and
    wherein, with respect to the driver, an action at the guidance point is an operation of the driver based on a direction following the route.

2. The navigation system of claim 1,
    wherein the running state of the vehicle includes acceleration of the vehicle.

3. The navigation system of claim 2,
    wherein the operation information relates to an accelerator pedal and a brake pedal.

4. The navigation system of claim 1,
    wherein the action predicting unit includes a plurality of templates and predicts the action at the guidance point by comparing the history of the acquired driving data with the plurality of templates, and
    wherein the plurality of templates are formed by classifying action patterns designated from accumulated data including one of (i) driving data previously acquired by the driving data acquiring unit and (ii) pseudo driving data corresponding to the previously acquired driving data.

5. The navigation system of claim 4,
    wherein the action predicting unit
    generates a plurality of accumulated data groups, each accumulated data group includes consecutive N1 pieces of accumulated data previously acquired for a given period up to a time when reaching the guidance point, wherein the N1 is a positive integer,
    classifies the plurality of accumulated data groups so that accumulated data groups approximating to each other are classified into a same cluster of a plurality of clusters,
    computes an average of accumulated data acquired at a same timing with respect to accumulated data groups of each cluster of the plurality of clusters so as to generate a plurality of average accumulated data groups, each average accumulated data group of which includes consecutive N1 pieces of average accumulated data,
    cuts off, with respect to each of the plurality of average accumulated data groups, a plurality of partial data groups, each partial data group of which includes consecutive N2 pieces of average accumulated data, wherein the N2 is a positive integer and smaller than the N1, wherein the consecutive N2 pieces of average accumulated data starts from each of individual starting points of the individual partial data groups, the individual starting points are shifted every a given length of a period of shift, and
    uses the plurality of partial data groups that are cut off as templates with respect to the each of the plurality of average accumulated data groups.

6. The navigation system of claim 4,
    wherein the plurality of templates are formed using the accumulated data acquired with respect to a plurality of drivers of the vehicle.

7. The navigation system of claim 4,
    wherein the plurality of templates are formed using the accumulated data acquired with respect to a given driver of the vehicle.

8. The navigation system of claim 4,
    wherein the plurality of templates are prepared for each of kinds of weather that are previously set, and
    wherein the action predicting unit changes the plurality of templates to be used, based on information that designates a kind of weather and is obtained from an outside of the vehicle.

9. The navigation system of claim 4,
    wherein the plurality of templates are prepared for each of periods of time that are previously set, and
    wherein the action predicting unit changes the plurality of templates to be used, based on information that designates a period of time and is obtained from an outside of the vehicle.

10. The navigation system of claim 1,
    wherein the preset allowable value is varied based on a speed of the vehicle.

11. The navigation system of claim 1,
    wherein the audio guidance executing unit includes a prohibiting unit that prohibits re-executing the audio guidance about the guidance point.

12. The navigation system of claim 1,
    wherein the audio guidance executing unit includes a prohibiting unit that prohibits re-executing the audio guidance about the guidance point for a predetermined period after the audio guidance is executed.

13. The navigation system of claim 1,
    wherein the audio guidance executing unit prohibits executing the audio guidance about the guidance point when the predicted action at the guidance point agrees with the action that the driver is required to take at the guidance point.

14. A navigation system provided in a vehicle, the navigation system comprising:
    a distance computing unit for acquiring route information indicating a route to a destination and position information indicating a present position of the vehicle, and for determining a distance to a guidance point included in the route information;
    a driving data acquiring unit for acquiring driving data including speed information about the vehicle and operation information about an operation that relates to a driver of the vehicle and has influence on a running state of the vehicle;
    an action predicting unit for predicting, with respect to the driver, an action at the guidance point based on a history of the acquired driving data; and
    an audio guidance executing unit for executing audio guidance about the guidance point when the determined distance is equal to or less than a preset allowable value and the predicted action disagrees with an action that the driver is required to take at the guidance point, wherein the action predicting unit includes a plurality of templates and predicts the action at the guidance point by comparing the history of the acquired driving data with the plurality of templates, and wherein the plurality of templates are formed by classifying action patterns designated from accumulated data including one of (i) driving data previously acquired by the driving data acquiring unit and (ii) pseudo driving data corresponding to the previously acquired driving data.

15. The navigation system of claim 14, wherein the action predicting unit generates a plurality of accumulated data groups, each accumulated data group includes consecutive N1 pieces of accumulated data previously acquired for a given period up to a time when reaching the guidance point, wherein the N1 is a positive integer, classifies the plurality of accumulated data groups so that accumulated data groups approximating to each other are classified into a same cluster of a plurality of clusters, computes an average of accumulated data acquired at a same timing with respect to accumulated data groups of each cluster of the plurality of clusters so as to generate a plurality of average accumulated data groups, each average accumulated data group of which includes consecutive N1 pieces of average accumulated data, cuts off, with respect to each of the plurality of average accumulated data groups, a plurality of partial data groups, each partial data group of which includes consecutive N2 pieces of average accumulated data, wherein the N2 is a positive integer and smaller than the N1, wherein the consecutive N2 pieces of average accumulated data starts from each of individual starting points of the individual partial data groups, the individual starting points are shifted every a given length of a period of shift, and uses the plurality of partial data groups that are cut off as templates with respect to the each of the plurality of average accumulated data groups.

16. The navigation system of claim 14, wherein the plurality of templates are formed using the accumulated data acquired with respect to a plurality of drivers of the vehicle.

17. The navigation system of claim 14, wherein the plurality of templates are formed using the accumulated data acquired with respect to a given driver of the vehicle.

18. The navigation system of claim 14, wherein the plurality of templates are prepared for each of kinds of weather that are previously set, and wherein the action predicting unit changes the plurality of templates to be used, based on information that designates a kind of weather and is obtained from an outside of the vehicle.

19. The navigation system of claim 14, wherein the plurality of templates are prepared for each of periods of time that are previously set, and wherein the action predicting unit changes the plurality of templates to be used, based on information that designates a period of time and is obtained from an outside of the vehicle.

20. The navigation system of claim 14, wherein the running state of the vehicle includes acceleration of the vehicle.

\* \* \* \* \*